United States Patent
Yoon et al.

(10) Patent No.: US 9,626,369 B2
(45) Date of Patent: Apr. 18, 2017

(54) METHOD AND APPARATUS FOR COLLECTING AND PROVIDING INFORMATION OF INTEREST TO USER REGARDING MULTIMEDIA CONTENT

(71) Applicant: SAMSUNG ELECTRONICS CO., LTD., Suwon-si (KR)

(72) Inventors: Seok-Hyun Yoon, Seoul (KR); Min-Hyok Bang, Seoul (KR); Hyun-Sik Yoon, Seoul (KR); Sung-Ho Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/328,842

(22) Filed: Jul. 11, 2014

(65) Prior Publication Data

US 2015/0134710 A1 May 14, 2015

Related U.S. Application Data

(62) Division of application No. 12/320,836, filed on Feb. 5, 2009, now Pat. No. 8,799,252.

(30) Foreign Application Priority Data

Sep. 4, 2008 (KR) .................. 10-2008-0087438

(51) Int. Cl.
*G06F 7/00* (2006.01)
*G06F 17/30* (2006.01)
(Continued)

(52) U.S. Cl.
CPC .. *G06F 17/30091* (2013.01); *G06F 17/30038* (2013.01); *G06F 17/30887* (2013.01);
(Continued)

(58) Field of Classification Search
None
See application file for complete search history.

(56) References Cited

U.S. PATENT DOCUMENTS 7,765,428 B2 7/2010 Armstrong
7,765,468 B2 7/2010 Munetsugu et al.
(Continued)

FOREIGN PATENT DOCUMENTS

JP 2008-71259 3/2008
KR 2003-0056312 7/2003
(Continued)

OTHER PUBLICATIONS

Korean Notice of Allowance issued Aug. 22, 2014 in corresponding Korean Patent Application 10-2008-0087438.
(Continued)

*Primary Examiner* — Tuan A Pham
(74) *Attorney, Agent, or Firm* — Staas & Halsey LLP (57) ABSTRACT

A method of collecting information of interest to a user regarding multimedia content is described. The method may include receiving first content about the information of interest to the user among the multimedia content, collecting metadata of the first content by using a uniform resource identifier (URI) of the first content, extracting at least one first information object including a schema according to a search category from the metadata, and storing the first information object in a first database.

11 Claims, 5 Drawing Sheets

(51) Int. Cl.
*H04N 21/258* (2011.01)
*H04N 21/845* (2011.01)

(52) U.S. Cl.
CPC . *G06F 17/30914* (2013.01); *H04N 21/25891* (2013.01); *H04N 21/8455* (2013.01)

(56) References Cited

U.S. PATENT DOCUMENTS

| | | | |
|---|---|---|---|
| 7,908,175 | B2 | 3/2011 | Chang et al. |
| 2002/0099694 | A1* | 7/2002 | Diamond ............ G06F 17/3002 |
| 2005/0183121 | A1 | 8/2005 | Kim et al. |
| 2007/0078904 | A1 | 4/2007 | Yoon et al. |
| 2007/0100988 | A1 | 5/2007 | Johnson et al. |
| 2008/0059323 | A1 | 3/2008 | Chang et al. |
| 2008/0177858 | A1* | 7/2008 | Aarnio .................... H04L 67/20 709/217 |
| 2008/0214104 | A1 | 9/2008 | Baumert et al. |
| 2008/0247363 | A1 | 10/2008 | Lee et al. |
| 2009/0083441 | A1* | 3/2009 | Clark et al. .................... 709/248 |
| 2009/0089651 | A1* | 4/2009 | Herberger et al. ........... 715/202 |
| 2009/0164421 | A1 | 6/2009 | Pacella |
| 2009/0199230 | A1* | 8/2009 | Kumar .................. G06Q 30/02 725/32 |
| 2009/0228467 | A1 | 9/2009 | Asanuma |

FOREIGN PATENT DOCUMENTS

| | | |
|---|---|---|
| KR | 10-2006-0104101 | 10/2006 |
| WO | 2008/016634 A2 | 2/2008 |

OTHER PUBLICATIONS

Ivan P. Fellegi et al., "A Theory for Record Linkage", Journal of the American Statistical Association, vol. 64, No. 328, Dec. 1969.
Mong Li Lee et al., "Cleaning the Spurious Links in Data", IEEE Intelligent Systems, 2004.
Mauricio A. Hernandez et al., "The Merge/Purge Problem for Large AI Databases", Department of Computer Science, Columbia University, New York, NY 10027, 1995.
U.S. Restriction Requirement mailed May 16, 2011 in related U.S. Appl. No. 12/320,836.
U.S. Office Action mailed Jul. 12, 2011 i in related U.S. Appl. No. 12/320,836.
U.S. Office Action mailed Dec. 22, 2011 in related U.S. Appl. No. 12/320,836.
U.S. Office Action mailed Apr. 26, 2013 in related U.S. Appl. No. 12/320,836.
U.S. Interview Summary mailed Jun. 1, 2013 in related U.S. Appl. No. 12/320,836.
U.S. Office Action mailed Oct. 16, 2013 in related U.S. Appl. No. 12/320,836.
U.S. Advisory Action mailed Dec. 27, 2013 in related U.S. Appl. No. 12/320,836.
U.S. Notice of Allowance mailed Mar. 26, 2014 i in related U.S. Appl. No. 12/320,836.
U.S. Appl. No. 12/320,836, filed Feb. 5, 2009, Seok-Hyun Yoon, Samsung Electronics Co., Ltd.

* cited by examiner

FIG. 6

METHOD AND APPARATUS FOR COLLECTING AND PROVIDING INFORMATION OF INTEREST TO USER REGARDING MULTIMEDIA CONTENT

CROSS-REFERENCE TO RELATED APPLICATIONS

This application is a divisional of U.S. application Ser. No. 12/320,836, filed Feb. 5, 2009, which claims the benefit of Korean Patent Application No. 10-2008-0087438, filed on Sep. 4, 2008, in the Korean Intellectual Property Office, the disclosures of which are incorporated herein in their entirety by reference.

BACKGROUND

1. Field

One or more embodiments relate to a method and apparatus for collecting and providing information of interest to a user, about multimedia content.

2. Description of the Related Art

Various types of content are continuously provided to users via a variety of devices and services in this digital multimedia era. Users select necessary information from various pieces of multimedia content information. At times, a need arises to record a corresponding document so that related content can be reproduced in the future.

In this case, according to the related art, various types of devices for reproducing multimedia store related content in a storage space thereof, or record the corresponding content in a space, such as a blog that is part of a social network via an Internet service.

For example, if content of interest or particular websites are found by surfing the Internet on a PC, a preference function of an Internet browser is used to store a corresponding webpage in a hard disk of the PC, which is a local storage medium. Alternatively, a bookmark service over the Internet is used to register a preferred site in an account. Similarly, content of the corresponding webpage is copied to a blog connected over the Internet. In the meantime, a rich site summary, a resource description framework (RDF) site summary, or a really simple syndication (RSS) reader is used to obtain periodically distributed documents such as news.

As another example, if desired goods are found from an Internet shopping mall, the desired goods are stored in a shopping list of a shopping mall site such as a shopping basket. Alternatively, a broadcast of interest is recorded while watching television (TV) and a digital camera such as a mobile phone camera is used to capture an image in daily life.

SUMMARY

One or more embodiments include a method and apparatus for collecting and providing information of interest to a user by integrating, administrating, and analyzing the information of interest to the user.

Additional aspects and/or advantages will be set forth in part in the description which follows and, in part, will be apparent from the description, or may be learned by practice of the invention.

To achieve the above and/or other aspects, one or more embodiments may include a method of collecting information of interest to a user, about multimedia content, the method including: receiving first content about the information of interest to the user among the multimedia content; collecting metadata of the first content by using a uniform resource identifier (URI) of the first content; extracting at least one first information object including a schema according to a search category from the metadata; and storing the first information object in a first database.

The method may further include: collecting web data from an external multimedia service including a web service by using a uniform resource locator (URL); extracting at least one second information object from the collected web data; storing the extracted second information object and additional information about the second information object in a second database; and mapping the first information object to the second information object.

The mapping of the first information object to the second information object may include: comparing a URI of the first information object with a URI of the second information object; if the second information object which is the same as the first information object does not existed in the second database, registering the first information object in a first database; if the second information object which is the same as the first information object exists in the second database, connecting the first information object to the second information object; and storing at least one piece of additional information about the second information object and the first information object in the first database together.

The first information object and the second information object may include at least one piece of goods information, area information, and broadcast program information.

The collecting of the web data may include: periodically collecting web data in order to obtain the additional information about the first information object and the second information object, wherein the mapping of the first information object to the second information object includes: periodically updating the first information object and the second information object based on the collected web data.

A bookmark may be used to receive the first content by using a representational state transfer (REST) or a simple object access protocol (SOAP), the metadata of the first content is caption information, and a keyword extraction, a tag analysis extraction, or a semantic extraction of a micro format is used to extract the first information object.

To achieve the above and/or other aspects, one or more embodiments may include a method of providing information of interest to a user via a multimedia device, the method including: receiving an index of a first information object about the information of interest to the user; searching for the first information object from a first database according to the received index; reading at least one piece of additional information mapped to the first information object from the first database; selecting additional information according to the type of the multimedia device from the at least one piece of additional information; and transmitting the selected additional information to the multimedia device.

The method may further include: converting the selected additional information into additional information having a format according to the type of the multimedia device, wherein the transmitting of the selected additional information includes: transmitting the converted additional information to the multimedia device.

The transmitting of the selected additional information to the multimedia device may include: analyzing the first information object stored in the first database; calculating a user's preference from the first information object; and transmitting a third information object having the user's preference greater than a predetermined threshold value among at least one second information object which is extracted from web data and stored in the second database that stores additional information about the at least one second information object, and additional information about the third information object according to the calculated user's preference to the multimedia device.

A REST or a SOAP may be used to search for the first information object.

To achieve the above and/or other aspects, one or more embodiments may include an apparatus for collecting information of interest to a user, about multimedia content, the apparatus including: a bookmark inputting unit inputting first content about the information of interest to the user among the multimedia content; a metadata collecting unit collecting metadata of the first content by using a URI of the first content; an information object extracting unit extracting at least one first information object including a schema according to a search category from the metadata; and a first database storing the first information object in a first database.

The apparatus may further include: a web information collecting unit collecting web data from an external multimedia service including a web service by using a URL; a web information analyzing unit extracting at least one second information object from the collected web data; a second database storing the extracted second information object and additional information about the second information object in a second database; and an information object identifying unit mapping the first information object to the second information object.

The information object identifying unit may compare a URI of the first information object with a URI of the second information object, if the second information object which is the same as the first information object does not existed in the second database, registers the first information object in a first database, if the second information object which is the same as the first information object exists in the second database, connects the first information object to the second information object, and stores at least one piece of additional information about the second information object and the first information object in the first database together.

The first information object to the second information object may include at least one piece of goods information, area information, and broadcast program information.

The web information collecting unit may periodically collect web data in order to obtain the additional information about the first information object and the second information object, the information object identifying unit periodically updating the first information object and the second information object based on the collected web data.

The bookmark inputting unit may use a bookmark through a REST or a SOAP, the metadata of the first content is caption information, and the information object extracting unit uses a keyword extraction, a tag analysis extraction, or a semantic extraction of a micro format.

To achieve the above and/or other aspects, one or more embodiments may include an apparatus of providing information of interest to a user via a multimedia device, the apparatus including: an index inputting unit receiving an index of a first information object about the information of interest to the user; a bookmark searching unit searching for the first information object from a first database according to the received index; an additional information reading unit reading at least one piece of additional information mapped to the first information object from the first database; an information selecting unit selecting additional information according to the type of the multimedia device from the at least one piece of additional information; and a transmitting unit transmitting the selected additional information to the multimedia device.

The apparatus may further include: a format converting unit converting the selected additional information into additional information having a format according to the type of the multimedia device, wherein the transmitting unit transmits the converted additional information to the multimedia device.

The apparatus may further include: a bookmark recommending unit including: an information object analyzing unit analyzing the first information object stored in the first database; a preference calculating unit calculating a user's preference from the first information object; and an information extending unit transmitting a third information object having the user's preference greater than a predetermined threshold value among at least one second information object which is extracted from web data and stored in the second database that stores additional information about the at least one second information object, and additional information about the third information object according to the calculated user's preference, to the multimedia device.

The bookmark searching unit may use a REST or a SOAP.

To achieve the above and/or other aspects, one or more embodiments may include a computer readable recording medium storing a program for executing the method of collecting information of interest to a user, about multimedia content.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present invention by referring to the figures.

Figure 1:
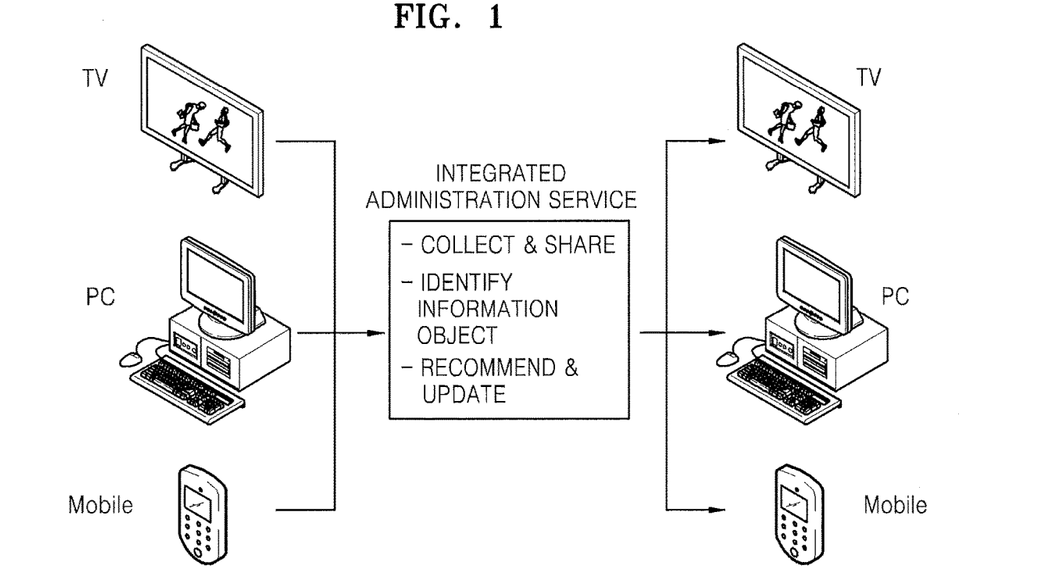
FIG. 1 illustrates an integrated administration service for information of interest independent of each device and service, according to an embodiment.

FIG. 1 illustrates an integrated administration service for providing information of interest independent of each device and service, according to an embodiment.

To record content that a user desires to use in the future, the related art method distributes and stores individual information of interest in each device such as a PC, a TV, a mobile phone, and the like or in each service domain such as a shopping mall site, etc. In addition, if the amount of information of interest increases by geometric progression, the related method stores the information of interest in a list, which is inconvenient. For example, it is not easy to visit a specific shopping mall site having preferred goods checked among numerous shopping malls over the Internet since it is required to visit all shopping mall sites. Furthermore, although a bookmark function of an Internet browser is used to browse desired information, since data is stored in the form of a list, it becomes more difficult to browse the desired information as the amount of data increases.

Also, since information is continuously updated, a user needs to update previously stored information of interest each time. For example, when the user attempts to visit a previously bookmarked site, the user may not find a corresponding webpage due to a change in the address of the previously bookmarked site, or when the user attempts to purchase goods stored in a shopping basket of an Internet shopping mall, a new model of the goods may already be released.

Therefore, one or more embodiments include a method and apparatus for collecting and providing up-to-date information of interest to the user by collecting, administering, and periodically analyzing distributed information of interest to the user. Referring to FIG. 1, the information of interest to the user is collected from various types of multimedia devices such as a TV, a PC, a mobile device, and the like, and is stored as a database so that multimedia devices can independently share the information of interest to the user. The collected information of interest to the user is recognized as various information objects, such as information about goods to be purchased via a shopping mall, area information such as an address and a telephone number, etc., broadcast program information obtained from an electronic program guide (EPG), and the like, and is stored. In addition, a process of recommending information of interest based on a user preference for extended information and automatically updating the user-information of interest is performed. In accordance with the information of interest integrated administration service, the user can search for his/her preference information by using any devices and up-to-date access related information.

Figure 2:
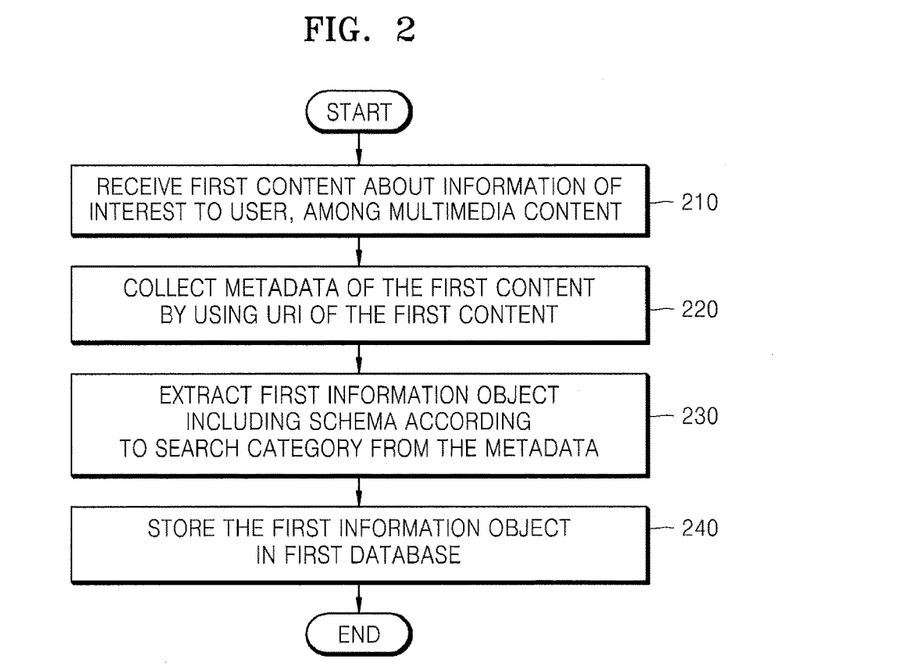
FIG. 2 is a flowchart illustrating a method of collecting information of interest to a user, about multimedia content, according to an embodiment.

FIG. 2 is a flowchart illustrating a method of collecting information of interest to the user about multimedia content, according to an embodiment.

Referring to FIG. 2, the method of collecting information of interest to the user about multimedia content includes operation 210 of receiving first content about the information of interest to the user, among the multimedia content, operation 220 of collecting metadata of the first content by using a uniform resource identifier (URI) of the first content, operation 230 of extracting at least one first information object including a schema according to a search category from the metadata, and operation 240 of storing the first information object in a first database.

In operation 210, content about the information of interest to the user is received. For example, a web page including content of interest may be selected from web pages being searched by a user via an Internet browser. Alternatively, a program being broadcast may be selected and recorded or a scene of the program may be captured while the user watches TV. Such operations are designated as a bookmark. In this regard, a representational state transfer (REST) or a simple object access protocol (SOAP), which is a web standard protocol, may be used.

In operation 220, the URI of the received content is used to collect metadata. The metadata includes all types of metadata included in digital multimedia, for example, caption information provided in digital broadcasting. The caption information includes both open caption information and closed caption information.

In operation 230, a first information object is extracted from the collected metadata. An information object is used in various types of terminals and services. The information object includes a specific schema such as goods, area name, broadcast, and the like, and has a variety of definitions according to application services. The information object is categorized and administered to enable it to be searched for according to standards used by various types of devices such as an Internet device, a navigation device, a TV, etc. To extract the first information object, a key word is extracted from the metadata such as a caption, an inner tag of an extensible markup language (XML) is analyzed and the information object is recognized, or a meaning based semantic is extracted from a micro format. The micro format may refer to an information formatting method of processing information in the form of metadata by using a web page and a hypertext markup language (HTML) or extensible HTML (XHTML), such as rich site summary (RSS), resource description framework (RDF) site summary, or really simple syndication (RSS).

In operation 240, the first information object is stored in the first database. The first information object is at least one of a goods information object, an area information object, and a broadcast information object extracted from content that is of interest to the user. The first database for storing the first information object is referred to as a bookmark storage unit. The bookmark storage unit stores a URI bookmarked by the user and various pieces of additional information, and the extracted information object.

In the present embodiment, the information of interest to the user is integrated and stored in a database that is a bookmark storage unit, independent of particular devices or services. Although the user selects and bookmarks a web page, a TV program, and the like, an address of the bookmarked web page or a snap shot of the TV program is not stored but at least one information object such as goods, area, broadcast, and the like is extracted and stored so that the user can share the above-described information objects.

Figure 3:
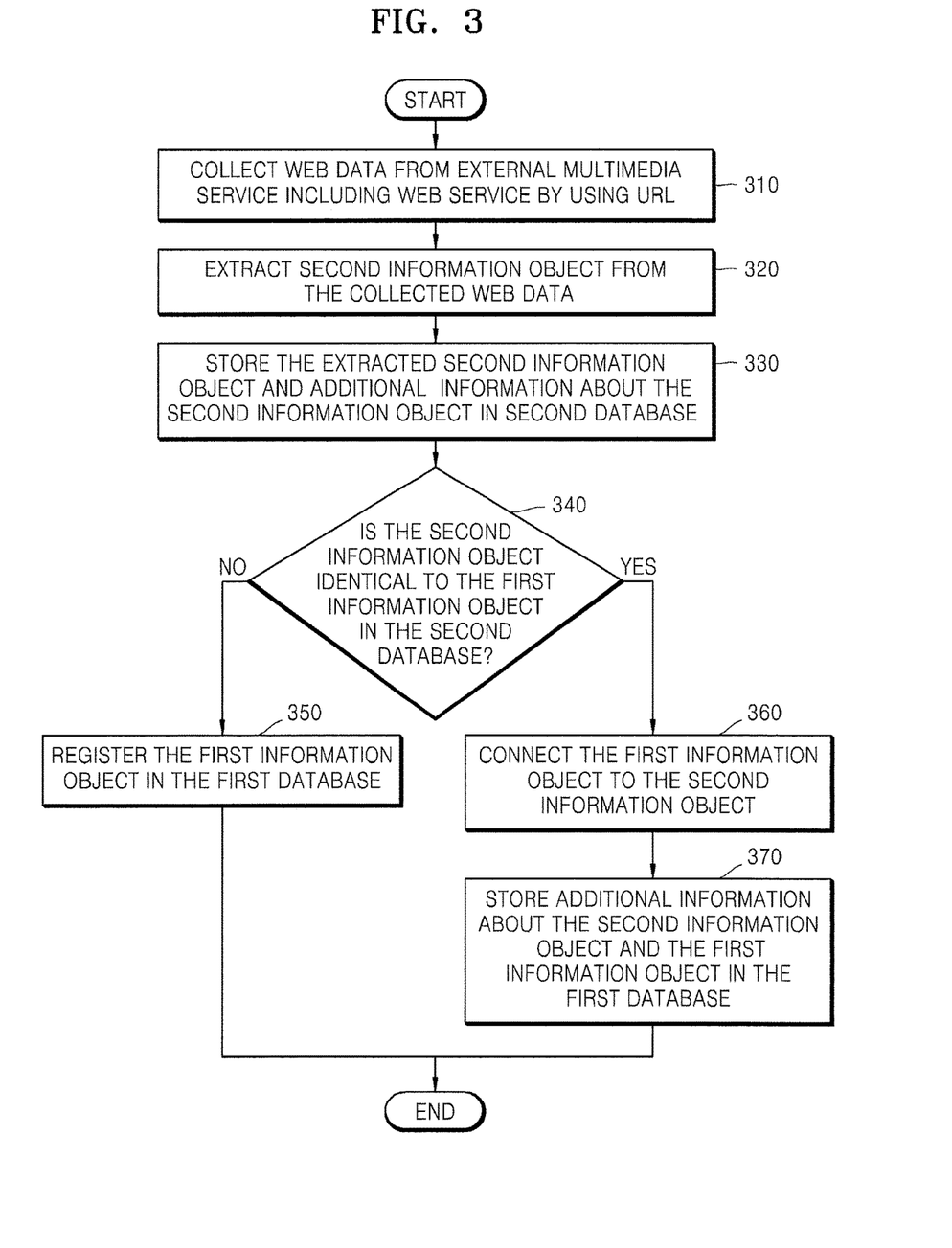
FIG. 3 is a flowchart illustrating a process of identifying information objects obtained from web data included in the method of collecting information of interest to the user, according to an embodiment.

FIG. 3 is a flowchart illustrating a process of identifying information objects obtained from web data included in the method of collecting information of interest to the user, according to an embodiment.

Referring to FIG. 3, the process of identifying information objects obtained from web data included in the method of collecting information of interest to the user includes operation 310 of collecting the web data from an external multimedia service including a web service by using a uniform resource locator (URL), operation 320 of extracting at least one second information object from the collected web data, operation 330 of storing the extracted second information object and additional information about the second information object in a second database, and operations 340 through 370 of mapping a previously stored first information object to the second information object.

The mapping of the first information object to the second information object includes operation 340 of comparing a URI of the first information object with a URI of the second information object and, if the second information object is not the same as the first information object stored in the second database, operation 350 of registering the first information object in a first database, and if the second information object is the same as the first information object stored in the second database, operation 360 of connecting the first information object to the second information object, and operation 370 of storing at least one piece of additional information about the second information object and the first information object in the first database.

In contrast with the first information object extracted from the content bookmarked by the user, the second information object includes a goods information object, an area information object, a broadcast information object, etc, extracted from the web data obtained via the external multimedia service. The second database for storing the second information object is referred to as a knowledge base. The knowledge base may be automatically built by storing the second information object and the additional information, or may be built in cooperation with another service.

The at least one second information object extracted from the web data and the additional information may be stored in the knowledge base. In this regard, an operation of identifying the first information object selected according to the information of interest to the user from the knowledge base is needed. Therefore, the first information object is compared to the second information object stored in the knowledge base (operation 340), and if they are the same, the first information object is connected to the second information object (operation 360), and the additional information stored in the knowledge base and the first information object of the information of interest are stored in a bookmark storage unit (operation 370). If the information object identical to the first information object of the information of interest is not previously stored in the knowledge base, the first information object is registered as the second information object and a URI is provided to the registered second information object (operation 350).

Thereafter, the knowledge base periodically collects web data in order to obtain the additional information about the first information object and the second information object, and periodically updates the first information object and the second information object that are mapped based on the collected web data. Therefore, the additional information about the first information object is automatically updated.

Figure 4:
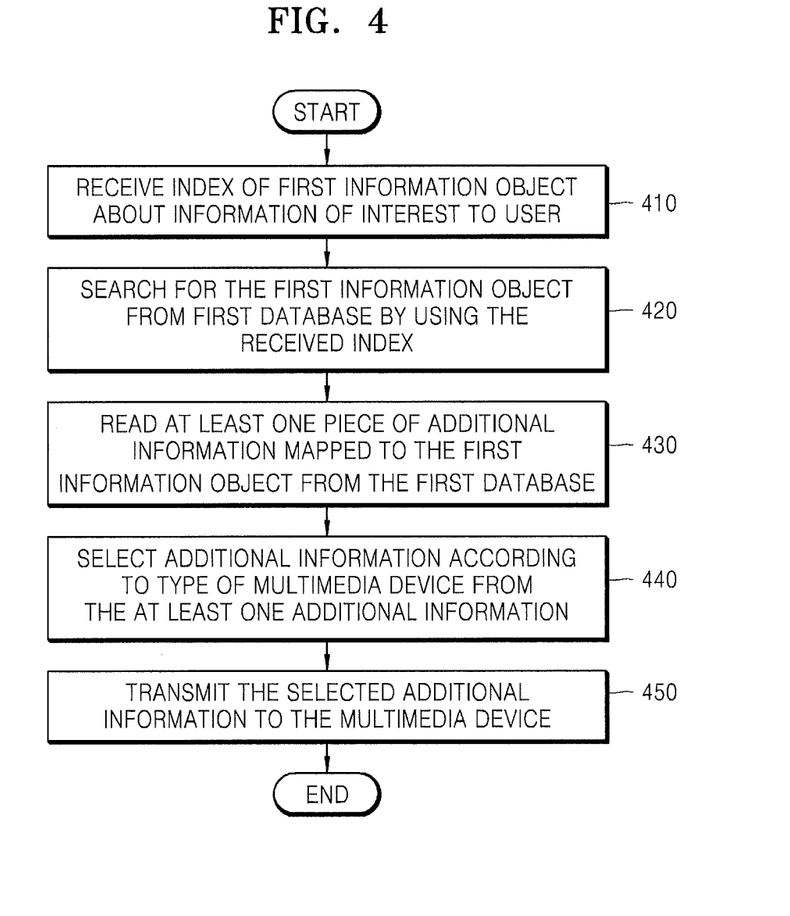
FIG. 4 is a flowchart illustrating a method of providing a user with information of interest via a multimedia device, according to an embodiment.

FIG. 4 is a flowchart illustrating a method of providing a user with information of interest to the user via a multimedia device, according to an embodiment.

Referring to FIG. 4, the method of providing the user with information of interest via the multimedia device includes operation 410 of receiving an index of a first information object about the information of interest, operation 420 of searching for the first information object from a first database according to the received index, operation 430 of reading at least one piece of additional information mapped to the first information object from the first database, operation 440 of selecting additional information according to the type of the multimedia device from the at least one piece of additional information, and operation 450 of transmitting the selected additional information to the multimedia device.

In operation 410, a bookmark index is received to search for the first information object relating to content bookmarked by the user. In the present embodiment, a search index for searching for stored personal bookmarks is generated, and an information object based search is supported. In operation 420, the first information object is searched from the first database that is a bookmark storage unit by using a REST or SOAP, which is a web standard protocol. In operation 430, various pieces of additional information that are mapped to the first information object, such as goods, an area, broadcast, etc., are read. In operation 440, one of the at least one piece of additional information is selected. The selected additional information is terminal-oriented information since the type of the multimedia device is a television, a PC, a mobile phone, a navigation device, and the like. In the present embodiment, the method of providing the user with information of interest may further include an operation of converting the selected additional information into additional information in a format that varies according to the type of multimedia device. In operation 450, the converted additional information may be transmitted to the corresponding device.

For example, in the case of the navigation device, additional information about the area may be selected and transmitted. In the case of the mobile phone, a telephone call may be transmitted. When the user uses the Internet, order information for the goods of a corresponding online shopping mall may be provided, and a related Internet event coupon may be issued.

As described above, the information of interest to the user may be stored in an integration database that is the bookmark storage unit independent of the multimedia device or service, and at least one of goods, an area information, and a broadcast program information object extracted from metadata relating to a bookmarked web page or TV broadcast is stored in the integration database so that the user can easily search for bookmarked information at anytime and anywhere in view of a terminal.

In another embodiment, information other than the bookmarked information may be recommended and provided to the user. To be more specific, the first information object of the information of interest to the user stored in the bookmark storage unit may be analyzed and a user's preference may be calculated from the first information object. The user may be provided with a third information object and additional information about the third information object according to the calculated user's preference. The third information object has the user's preference greater than a predetermined threshold value among the second information object stored in the knowledge base.

Figure 5:
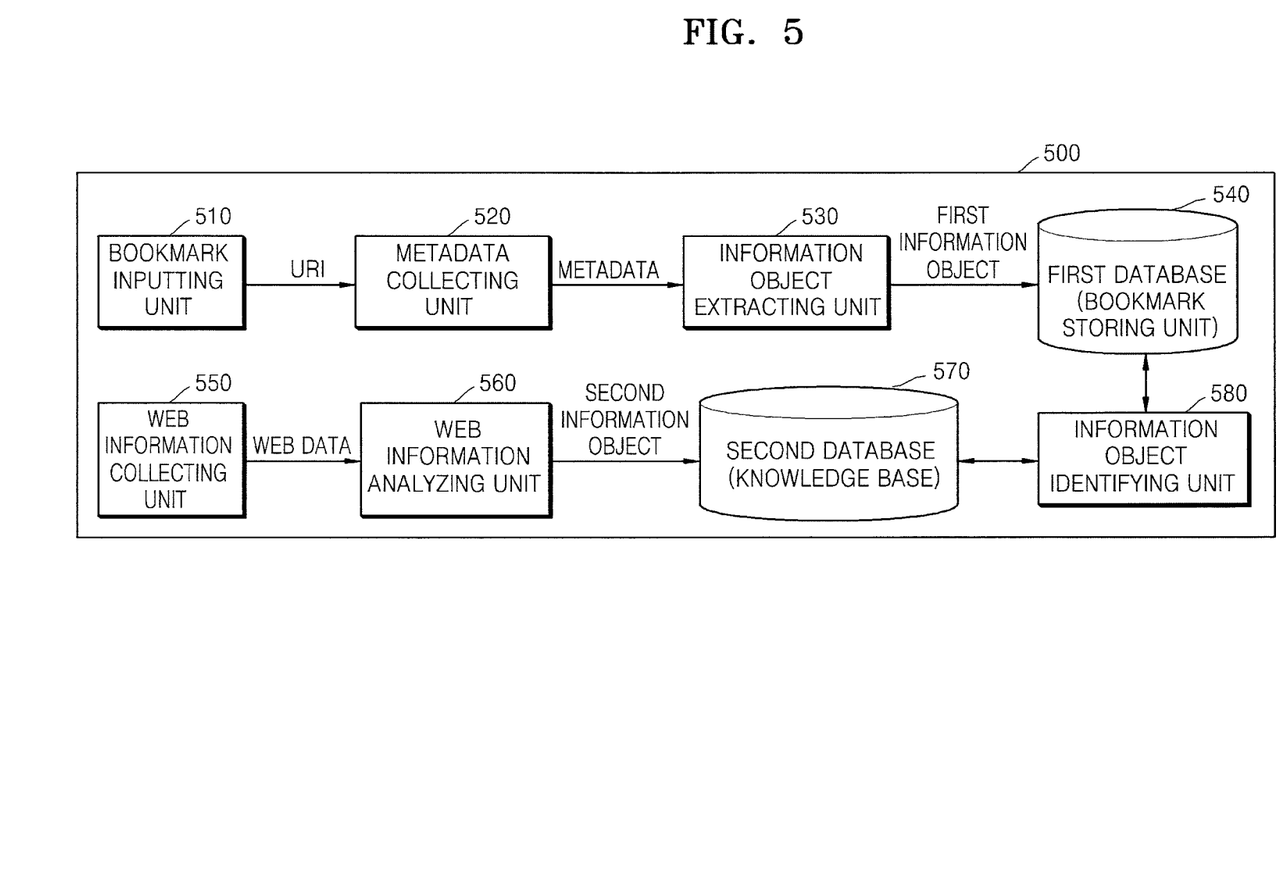
FIG. 5 is a block diagram of an apparatus for collecting information of interest to a user, about multimedia content, according to an embodiment.

FIG. 5 is a block diagram of an apparatus 500 for collecting information of interest to the user, about multimedia content, according to an embodiment.

Referring to FIG. 5, the apparatus 500 for collecting information of interest to the user about multimedia content, includes a bookmark inputting unit 510 for inputting first content about the information of interest to the user among the multimedia content, a metadata collecting unit 520 for collecting metadata of the first content by using a URI of the first content, an information object extracting unit 530 for extracting at least one first information object including a schema according to a search category from the metadata, and a bookmark storing unit 540 for storing the first information object.

The apparatus 500 for collecting information of interest to the user about multimedia content, further includes a web information collecting unit 550 for collecting web data from an external multimedia service including a web service by using a URL, a web information analyzing unit 560 for extracting at least one second information object by analyzing the collected web data, a knowledge base 570 for storing the extracted second information object and additional information about the second information object, and an information object identifying unit 580 mapping the stored first information object to the second information object.

The information object identifying unit 580 compares the first information object with the second information object stored in the knowledge base 570, and if they are the same, connects the first information object to the second information object, and stores the additional information stored in the knowledge base 570 and the first information object in the bookmark storing unit 540. If the same information object as the first information object of the information of interest to the user is not stored in the knowledge base 570, the information object identifying unit 580 newly registers the first information object as the second information object and provides a URI to the newly registered second information object. Thereafter, the web information collecting unit 550 periodically collects web data in order to obtain the additional information about the first information object and the second information object and stores the collected web data in the knowledge base 570. The information object identifying unit 580 periodically updates the first information object and the second information object based on the collected web data and maintains and administers the bookmark information.

Figure 6:
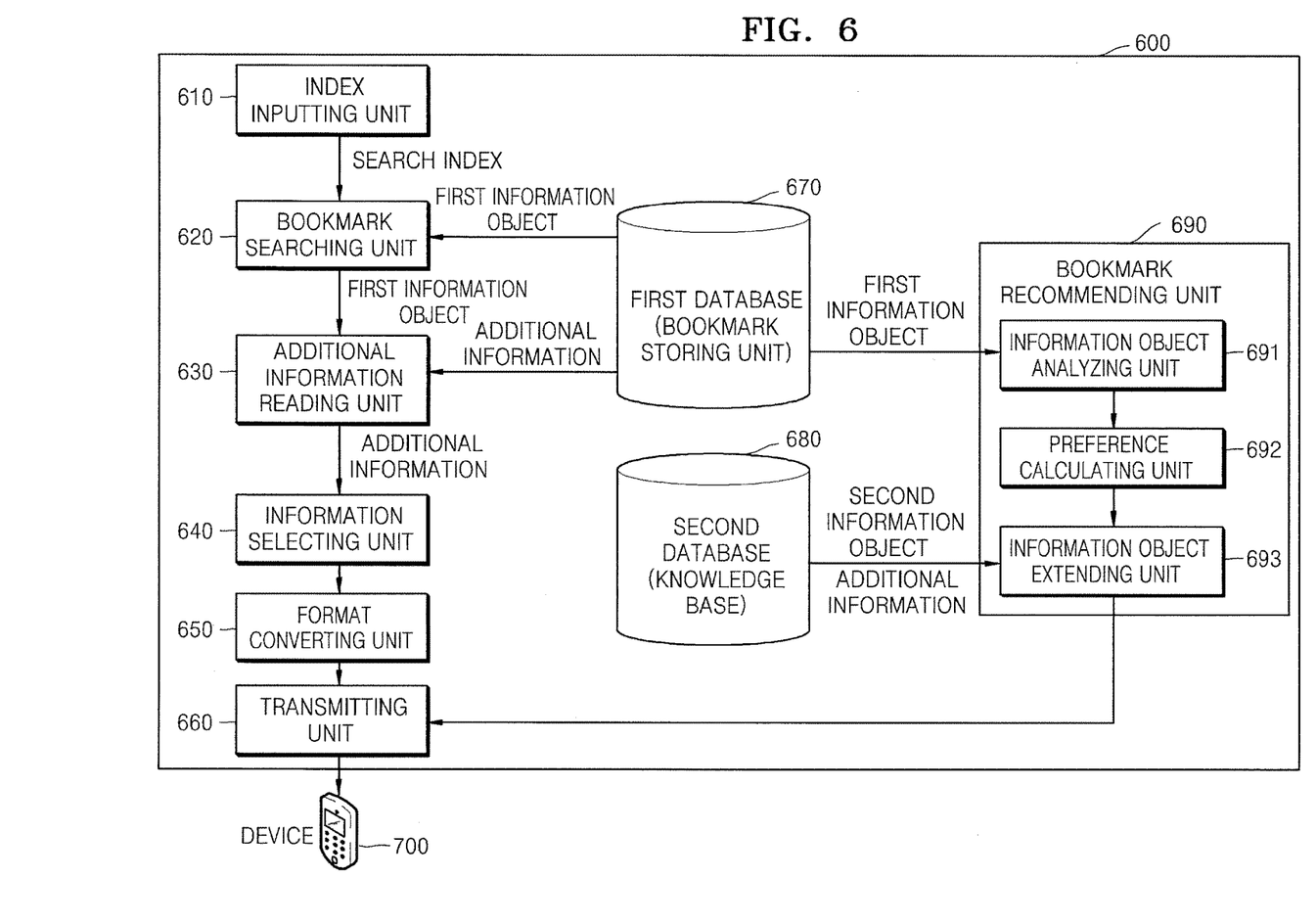
FIG. 6 is a block diagram of an apparatus for providing information of interest to a user via a multimedia device, according to an embodiment.

FIG. 6 is a block diagram of an apparatus 600 for providing information of interest to the user via a multimedia device 700, according to an embodiment.

Referring to FIG. 6, the apparatus 600 for providing information of interest to the user via the multimedia device 700 includes an index inputting unit 610 for receiving an index of a first information object about the information of interest to the user, a bookmark searching unit 620 for searching for the first information object from the bookmark storing unit 670 according to the received index, an additional information reading unit 630 for reading at least one piece of additional information mapped to the first information object from the bookmark storing unit 670, an information selecting unit 640 for selecting additional information according to the type of the multimedia device 700 from the at least one piece of additional information, and a transmitting unit 660 for transmitting the selected additional information to the multimedia device 700. The apparatus 600 for providing information of interest to the user via the multimedia device 700 may include a format converting unit 650 for converting the selected additional information into additional information in a format according to the type of the multimedia device 700.

The apparatus 600 for providing information of interest to the user via the multimedia device 700 may further include a bookmark recommending unit 690 including an information object analyzing unit 691 for analyzing the first information object stored in the bookmark storing unit 670, a preference calculating unit 692 for calculating a user's preference from the first information object, and an information object extending unit 693 for transmitting a third information object having a user's preference greater than the predetermined threshold value of the second information object stored in the knowledge base 680 and additional information about the third information object according to the calculated user's preference to the transmitting unit 660.

In addition, other embodiments can also be implemented through computer readable code/instructions in/on a media/medium, e.g., a computer readable medium, to control at least one processing element to implement any of the above described embodiments. The medium can correspond to any medium/media permitting the storage and/or transmission of the computer readable code.

The computer readable code/instructions may be recorded/transferred in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks, DVD disks and Blu Ray disks; magneto-optical media such as optical disks; and hardware devices that are specially configured to store and perform program instructions, such as read-only memory (ROM), random access memory (RAM), flash memory, and the like. The media may also be transmitted over a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the above-described embodiments.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of collecting information of interest to a user about multimedia content, the method comprising:

receiving, from a plurality of multimedia terminal devices, user-selected first content about the information of interest to the user among the multimedia content;

collecting metadata of the first content by parsing a resource using a uniform resource identifier (URI) of the first content;

extracting at least one first information object including a schema according to a search category from the collected metadata;

storing the first information object in a first database, which is independent of the plurality of multimedia terminal devices, collecting web data from an external multimedia service including a web service by using a uniform resource locator (URL);

extracting at least one second information object from the collected web data;

storing the extracted second information object and additional information about the second information object in a second data base; and mapping the first information object to the second information object, wherein:

the first information object is categorized according to a type of a plurality of multimedia terminal devices which searches for the first information object, and the mapping of the first information object to the second information object comprises:

comparing a URI of the first information object with a URI of the second information object:

registering the first information object in the first database if the second information object, which is the same as the first information object, does not exist in the second database;

connecting the first information object to the second information object if the second information object, which is the same as the first information object, exists in the second database; and storing at least one piece of additional information about the second information object and the first information object together in the first database.

2. The method of claim 1, wherein the first information object and the second information object comprise at least one piece of goods information, area information, and broadcast program information.

3. The method of claim 2, wherein the collecting of the web data comprises:
periodically collecting web data in order to obtain the additional information about the first information object and the second information object,
wherein the mapping of the first information object to the second information object includes periodically updating the first information object and the second information object based on the collected web data.

4. The method of claim 1, wherein a bookmark is used to receive the first content by using a representational state transfer (REST) or a simple object access protocol (SOAP),
the metadata of the first content is caption information, and
at least one of a keyword extraction, a tag analysis extraction, or a semantic extraction of a micro format is used to extract the first information object.

5. The method of claim 1,
wherein the first database further comprises at least one piece of additional information that is mapped to the first information object, and additional information that is in accord with the type of the multimedia device is selected from the at least one piece of additional information; and
the selected additional information is provided to the multimedia device.

6. A non-transitory computer-readable recording medium storing a program that is executable by a computer to perform a method of collecting information of interest to a user about multimedia content, the method comprising:
receiving, from a plurality of multimedia terminal devices, user-selected first content about the information of interest to the user among the multimedia content;
collecting metadata of the first content by parsing a resource using a uniform resource identifier (URI) of the first content;
extracting at least one first information object including a schema according to a search category from the collected metadata;
storing the first information object in a first database, which is independent of the plurality of multimedia terminal devices,
collecting web data from an external multimedia service including a web service by using a uniform resource locator (URL);
extracting at least one second information object from the collected web data;
storing the extracted second information object and additional information about the second information object in a second database; and
mapping the first information object to the second information object,
wherein:
the first information object is categorized according to a type of a plurality of multimedia terminal devices which searches for the first information object, and
the mapping of the first information object to the second information object comprises:
comparing a URI of the first information object with a URI of the second information object;
registering the first information object in the first database if the second information object, which is the same as the first information object, does not exist in the second database;
connecting the first information object to the second information object if the second information object, which is the same as the first information object, exists in the second database; and
storing at least one piece of additional information about the second information object and the first information object together in the first database.

7. An apparatus for collecting information of interest to a user about multimedia content, the apparatus comprising:
at least one hardware processor that executes instructions to cause the apparatus to perform:
receiving, from a plurality of multimedia devices, input the user-selected first content about the information of interest to the user among the multimedia content;
collecting metadata of the first content by parsing a resource using a URI of the first content;
extracting at least one first information object including a schema according to a search category from the collected metadata;
storing the first information object in a first database, which is independent of the plurality of multimedia terminal devices,
collecting web data from an external multimedia service including a web service by using a URL;
extracting at least one second information object from the collected web data;
storing the extracted second information object and additional information about the second information object in a second database; and
mapping the first information object to the second information object,
wherein the first information object is categorized according to a type of a plurality of multimedia terminal devices which searches for the first information object, and
the extracting the at least one first information object includes comparing a URI of the first information object with a URI of the second information object, if the second information object which is the same as the first information object does not exist in the second database, registers the first information object in the first database, if the second information object which is the same as the first information object exits in the second database, connects the first information object to the second information object, and stores at least one piece of additional information about the second information object and the first information object in the first database together.

8. The apparatus of claim 7, wherein the comparing the URI of the first information object to the URI of the second information object comprises at least one piece of goods information, area information, and broadcast program information.

9. The apparatus of claim 8, wherein the collecting the web data includes periodically collecting web data in order to obtain the additional information about the first information object and the second information object, and
wherein the extracting the at least one first information object includes periodically updating the first information object and the second information object based on the collected web data.

10. The apparatus of claim 9, wherein the receiving the input user-selected first content includes using a bookmark through at least one of a representational state transfer (REST) or a simple object access protocol (SOAP),
  the metadata of the first content is caption information, and
  the information object extracting unit uses a keyword extraction, a tag analysis extraction, or a semantic extraction of a micro format.

11. The apparatus of claim 7, wherein the receiving the input user-selected first content includes using a bookmark through at least one of a representational state transfer (REST) or a simple object access protocol (SOAP);
  the metadata of the first content is caption information; and
  the information object extractor uses a keyword extraction, a tag analysis extraction, or a semantic extraction of a micro format.

\* \* \* \* \*